(12) United States Patent
Park et al.

(10) Patent No.: US 10,368,261 B2
(45) Date of Patent: Jul. 30, 2019

(54) SYNCHRONIZATION METHOD AND APPARATUS FOR D2D COMMUNICATION

(71) Applicant: Samsung Electronics Co., Ltd., Suwon-si, Gyeonggi-do (KR)

(72) Inventors: Seung-Hoon Park, Seoul (KR); Hyun-Seok Ryu, Yongin-si (KR); Peng Xue, Hwaseong-si (KR); Hyun-Kyu Yu, Suwon-si (KR); Cheol Jeong, Seongnam-si (KR); Sang-Won Choi, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 167 days.

(21) Appl. No.: 14/707,550

(22) Filed: May 8, 2015

(65) Prior Publication Data

US 2015/0327204 A1 Nov. 12, 2015

(30) Foreign Application Priority Data

May 9, 2014 (KR) .................. 10-2014-0055968
May 16, 2014 (KR) .................. 10-2014-0058771

(51) Int. Cl.
H04W 24/10 (2009.01)
H04W 56/00 (2009.01)
H04W 88/04 (2009.01)
H04W 76/14 (2018.01)

(52) U.S. Cl.
CPC ....... H04W 24/10 (2013.01); H04W 56/0015 (2013.01); H04W 56/0025 (2013.01); H04W 76/14 (2018.02); H04W 88/04 (2013.01)

(58) Field of Classification Search
CPC . H04W 76/023; H04W 92/18; H04W 72/042; H04W 76/021; H04W 72/04; H04W 4/005; H04W 76/14; H04W 8/005; H04W 4/70; H04W 88/04; H04W 24/10; H04W 88/02; H04W 56/0015; H04W 56/0025
See application file for complete search history.

(56) References Cited

U.S. PATENT DOCUMENTS

2014/0023008 A1* 1/2014 Ahn .................... H04W 76/023
                                                                    370/329
2014/0050126 A1    2/2014 Naden et al.
2015/0009949 A1*  1/2015 Khoryaev ............. H04W 48/16
                                                                    370/330

(Continued)

Primary Examiner — Asad M Nawaz
Assistant Examiner — Najeeb Ansari
(74) Attorney, Agent, or Firm — Jefferson IP Law, LLP

(57) ABSTRACT

A synchronization method and an apparatus for Device-to-Device (D2D) communication in a User Equipment (UE) are provided. The method includes comparing a reception power of a signal received from an evolved Node B (eNB) with a first reference power, if the reception power is less than the first reference power, generating and transmitting a synchronization signal for D2D communication by operating as a synchronization reference UE, comparing the reception power of a signal received from the eNB with a second reference power, and if the reception power is greater than or equal to the first reference power and less than the second reference power, relaying a synchronization signal received from the eNB by operating as a synchronization relaying UE.

18 Claims, 17 Drawing Sheets

(56) References Cited

U.S. PATENT DOCUMENTS

| | | | |
|---|---|---|---|
| 2015/0327195 A1* | 11/2015 | Chiu | H04W 56/002 |
| | | | 370/350 |
| 2015/0351059 A1* | 12/2015 | Seo | H04W 56/002 |
| | | | 370/350 |
| 2016/0192310 A1* | 6/2016 | Sorrentino | H04J 3/0638 |
| | | | 370/350 |
| 2016/0198414 A1* | 7/2016 | Yano | H04W 52/383 |
| | | | 455/522 |
| 2016/0205644 A1* | 7/2016 | Seo | H04W 56/001 |
| | | | 370/350 |
| 2016/0227495 A1* | 8/2016 | Lee | H04W 56/00 |
| 2016/0255597 A1* | 9/2016 | Zhao | H04W 52/322 |
| 2016/0262111 A1* | 9/2016 | Boudreau | H04W 76/14 |
| 2016/0270010 A1* | 9/2016 | Sorrentino | H04W 76/02 |
| 2016/0278003 A1* | 9/2016 | Kim | H04W 48/16 |

* cited by examiner

SYNCHRONIZATION METHOD AND APPARATUS FOR D2D COMMUNICATION

CROSS-REFERENCE TO RELATED APPLICATION(S)

This application claims the benefit under 35 U.S.C. § 119(a) of a Korean patent application filed on May 9, 2014 in the Korean Intellectual Property Office and assigned Serial Number 10-2014-0055968, and of a Korean patent application filed on May 16, 2014 in the Korean Intellectual Property Office and assigned Serial number 10-2014-0058771, the entire disclosure of each of which is hereby incorporated by reference.

TECHNICAL FIELD

The present disclosure relates to a method and an apparatus for supporting synchronization for Device-to-Device (D2D) communication.

BACKGROUND

To meet the demand for wireless data traffic having increased since deployment of 4G (4$^{th}$-Generation) communication systems, efforts have been made to develop an improved 5G (5$^{th}$-Generation) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is underway based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid FSK and QAM Modulation (FQAM) and sliding window superposition coding (SWSC) as an advanced coding modulation (ACM), and filter bank multi-carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Currently, data traffic has increased dramatically due to the rapid spread of smartphones. The Korea Communications Commission (KCC) has reported that due to the accelerated spread of smartphones, mobile data traffic in 2013 was increased 3 times compared to the previous year. The number of smartphone users will further increase and application services using the smartphones will be more popularized, so the mobile data traffic is expected to increase much more than now. In particular, if even Machine-to-Machine Communication (MTM) utilizing things, such as communication between people and things and communication between things, which will provide a new mobile market, is commercialized in addition to the communication between people, the traffic that is transmitted to a Base Station (BS) or an evolved Node B (eNB) is expected to increase exponentially, so it may be difficult to deal with the traffic.

Therefore, technology capable of addressing these issues is needed, and currently, end-to-end direct communication technology has attracted much attention. This technology, called Device-to-Device (D2D) communication, has attracted attention in both the licensed band that is used by the cellular mobile communication, and the unlicensed band that is used by local communication, such as Wireless Local Area Network (WLAN).

If the end-to-end direct (or D2D) communication is integrated with the cellular mobile communication, it is noteworthy in that it is possible to increase the traffic capacity of the eNB and reduce the overload of the eNB. In other words, if terminals or multiple User Equipment (UEs) in the same cell or adjacent cells establish a D2D link between them, and then directly exchange data with each other though the D2D link without passing through the eNB, it is possible to advantageously reduce two links (e.g., a link from a UE to an eNB and a link from the eNB to another UE) to one link (e.g., a link from the UE to another UE).

Research in the unlicensed band is aimed to prevent the unnecessary waste of wireless resources by recognizing the needs for communication between people, communication between people and things, and communication between things, and to determine the locally generated traffic and properly service the traffic. Therefore, the research is focused on the method of efficiently operating the process in which a plurality of UEs broadcast information about the service or content to their surroundings and receive a response thereto.

In order to perform D2D communication, a process of setting up synchronization between UEs is needed. A UE may set up synchronization between UEs by using the time information received through a synchronous eNB or a Global Positioning System (GPS) reception module. In the scheme where a UE sets up synchronization between UEs by using the time information received through the synchronous eNB or the GPS reception module, the UE needs a connection to the synchronous eNB or the GPS reception module.

However, if the communication scheme provided by the communication operator does not support the synchronous eNB, the UE may not set up synchronization by using the time information received through the synchronous eNB. In addition, if a UE is located in a GPS shaded area (e.g., the space between skyscrapers, the tunnel, the interior of a building, and the like), the UE may not receive the time information from the GPS satellites, so the UE may not set up synchronization for D2D communication. As a result, if the UE's connection to the synchronous eNB or the GPS reception module is not smooth, the UE may not even initiate D2D communication.

Therefore, a need exists for a method and an apparatus for supporting synchronization for a D2D communication.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for supporting synchronization between multiple User Equipment (UEs), which is used for Device-to-Device (D2D) communication.

Another aspect of the present disclosure is to provide a synchronization resource structure, synchronization-related information and synchronization procedure used for D2D communication in partial network coverage area.

In accordance with an aspect of the present disclosure, a D2D communication method in a UE is provided. The method includes comparing a reception power of a signal received from an evolved Node B (eNB) with a first reference power, generating and transmitting, if the reception power is less than the first reference power, a synchronization signal for D2D communication by operating as a synchronization reference UE, comparing the reception power of a signal received from the eNB with a second reference power, and relaying, if the reception power is greater than or equal to the first reference power and less than the second reference power, a synchronization signal received from the eNB by operating as a synchronization relaying UE.

In accordance with another aspect of the present disclosure, an apparatus for performing D2D communication in a UE is provided. The apparatus includes a controller configured to compare reception power of a signal received from an eNB with a first reference power, to generate, if the reception power is less than the first reference power, a synchronization signal for D2D communication by operating as a synchronization reference UE, to compare the reception power of a signal received from the eNB with a second reference power, and to determine, if the reception power is greater than or equal to the first reference power and less than the second reference power, to relay a synchronization signal received from the eNB by operating as a synchronization relaying UE, and a transmitter configured to transmit the generated synchronization signal, or relay the synchronization signal received from the eNB.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
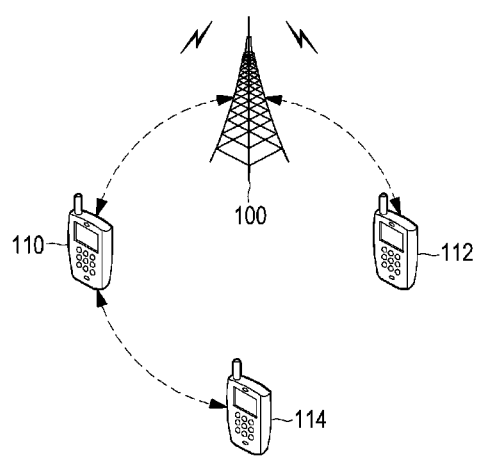
FIG. 1 illustrates a structure of a communication system supporting Device-to-Device (D2D) communication according to an embodiment of the present disclosure.

FIG. 1 illustrates a structure of a communication system supporting Device-to-Device (D2D) communication according to an embodiment of the present disclosure.

Referring to FIG. 1, a Base Station (BS) or an evolved Node B (eNB) 100 and a plurality of terminals or multiple User Equipment (UEs) 110 and 112 may exist in a network. The eNB 100, which is an entity for communicating with the UEs 110 and 112, may be referred to as a BS, a Base Transceiver Station (BTS), a Node B (NB), an eNB, an Access Point (AP), and the like. The UEs 110 and 112, which are entities for communicating with the eNB 100, may be referred to as a UE, a device, a Mobile Station (MS), a Mobile Equipment (ME), a terminal, and the like.

Each of the UEs 110 and 112 existing in the cellular network coverage area of the eNB 100 may be in a Radio Resource Control (RRC)_IDLE state in which the connection of the UEs 110 and 112 to the eNB 100 is not established, or in an RRC_CONNECTED state in which the connection of the UEs 110 and 112 to the eNB 100 is established. A UE in the RRC_IDLE state may perform eNB selection (or cell selection), monitor a paging channel and acquire System Information (SI), but may not exchange data with the eNB 100. A UE in the RRC_CONNECTED state may monitor a control channel, and exchange data with the eNB 100 over a data channel. In the RRC_CONNECTED state, the UE may report several measurement results for the eNB 100 and the UE's surrounding eNBs to assist in scheduling by the eNB 100.

As an example, the UEs 110 and 112 may establish their links to the eNB 100 and then communicate with each other through the eNB 100, and may be synchronized with the eNB 100. As another example, UEs 110 and 114 located in or out of the cellular network coverage area may directly communicate with each other via a D2D link without passing through the eNB 100, and to this end, the UEs 110 and 114 should be synchronized with each other. The UE 114 may be either a UE (e.g., a cellular UE) capable of communicating with the eNB 100, or a UE (e.g., a D2D-dedicated UE) that cannot support cellular communication and can support only the D2D communication. For synchronization for D2D communication, the UEs 110, 112, and 114 may use a synchronization signal.

UEs performing D2D communication may be divided into a synchronization transmission UE (Sync Tx UE) and a synchronization reception UE (Sync Rx UE) according to their roles. The synchronization transmission UE (that can be referred to as a synchronization source) is a UE that transmits a D2D Synchronization Signal (D2DSS), a D2D Synchronization Channel (D2DSCH), a D2D Broadcast Channel (D2DBCH), or a D2D System Information Channel (D2D SICH), and may include a synchronization reference UE or a synchronization relaying UE. In some cases, an eNB that transmits a D2D synchronization signal may operate as a synchronization reference UE. The synchronization reception UE (that can be referred to as a D2D UE) may mean a UE that receives (does not transmit) a synchronization signal or a synchronization channel.

The synchronization signal refers to a signal including a synchronization sequence that can be used to distinguish a cluster or a synchronization transmission UE, and the synchronization signal resource refers to a resource used to transmit the synchronization signal. The synchronization channel (e.g., a D2D broadcast channel or a D2D system information channel) refers to a channel including a synchronization-related message or a system-related message, and the synchronization channel resource refers to a resource that carries the synchronization channel. The synchronization transmission UE may transmit a synchronization signal or a synchronization channel. In the following description, for convenience, it should be noted that the synchronization signal may be construed to include both the synchronization signal and the synchronization channel, unless strictly defined. The synchronization channel, when strictly defined, may be referred to as a D2D broadcast channel.

The synchronization reference UE (that can be referred to as an Independent Synchronization Source (I-SS)) is a synchronization transmission UE that plays a role of a Synchronization Host (SH) for generating a cluster, and may independently determine the timing, unless it is present in the eNB coverage area.

The synchronization relaying UE (that can be referred to as a Relay Synchronization Source (R-SS) or a Dependent Synchronization Source (D-SS)) is a synchronization transmission UE, which synchronizes the UE's timing with the synchronization reference UE, and then relays (i.e., receives and delivers) a synchronization signal or a synchronization channel from the synchronization reference UE. For example, when the synchronization relaying UE delivers (or forwards) a synchronization signal from the eNB, the synchronization relaying UE may play a role of an SH.

If UEs can exist in or out of the cellular network coverage area, the UEs may be assumed to belong to a partial network. Hereinafter, in an embodiment of the present disclosure, procedures in three possible cases will be described with respect to a method of determining a synchronization relaying UE in the partial network.

Figure 2:
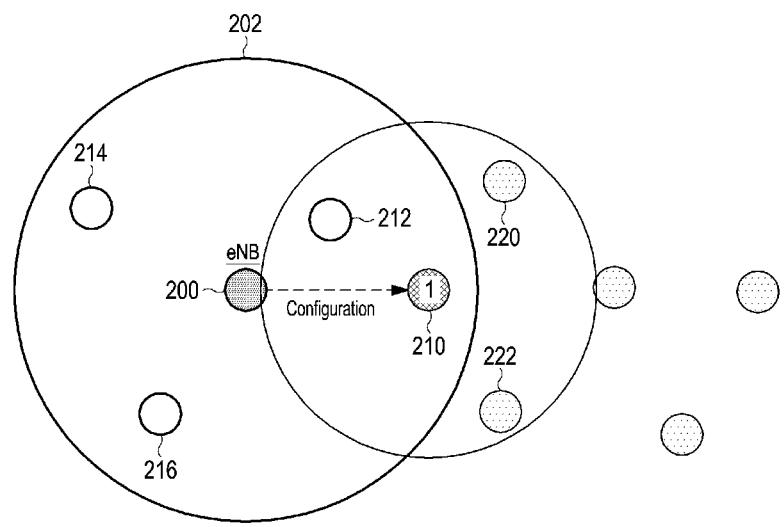
FIG. 2 illustrates an operation of determining a synchronization relaying User Equipment (UE) located in a cellular network coverage area according to an embodiment of the present disclosure.

FIG. 2 illustrates an operation of determining a synchronization relaying UE located in a cellular network coverage area according to an embodiment of the present disclosure.

Referring to FIG. 2, a cell (e.g., a cellular network coverage area 202) may be formed by an eNB 200, and a plurality of UEs 210, 212, 214, and 216 capable of performing cellular communication or D2D communication may exist in the cellular network coverage area 202. When a synchronization relaying UE is determined in the cellular network coverage area 202, the synchronization relaying UE may be determined by the eNB 200. In an embodiment of the present disclosure, the eNB 200 may select one UE 210 among the UEs 210, 212, 214, and 216 in the coverage area 202 as a synchronization relaying UE without relying on the UE report. In an embodiment of the present disclosure, the eNB 200 may select one UE 210 as a synchronization relaying UE based on the reports from the UEs 210, 212, 214, and 216. The synchronization relaying UE 210 may receive and relay a synchronization signal (or a synchronization channel) transmitted from the eNB 200, and UEs 220 and 222 located out of the coverage area 202 may receive the synchronization signal to be synchronized with the synchronization relaying UE 210, and then initiate D2D communication.

In the case where the eNB 200 selects a synchronization relaying UE based on the UE reports, the eNB 200 may transmit a measurement instruction to the UEs 210, 212, 214, and 216, and select a synchronization relaying UE based on the measurement results reported by the UEs 210, 212, 214, and 216. In an embodiment of the present disclosure, the UE 210 may transmit a request for a synchronization relaying operation to the eNB 200, and the eNB 200 may select the UE 210 as a synchronization relaying UE based on the request from the UE 210. In an embodiment of the present disclosure, the UE 210 may directly determine whether to operate as a synchronization relaying UE according to the determination condition specified by the eNB 200.

Figure 3:
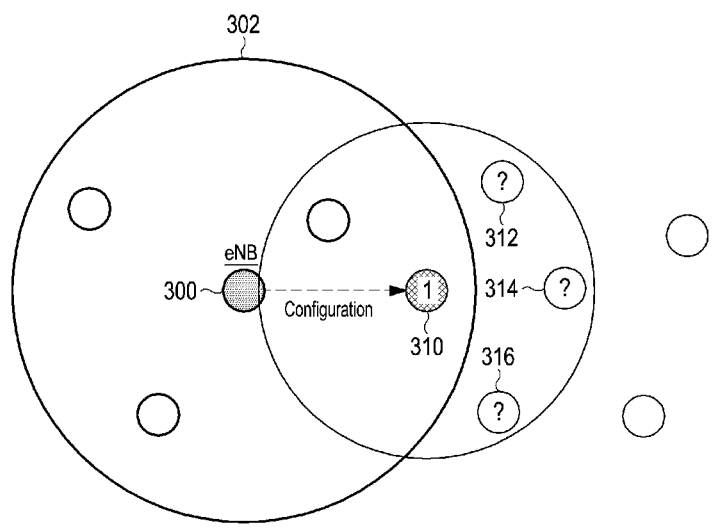
FIG. 3 illustrates an operation of determining a synchronization relaying UE located out of a cellular network coverage area according to an embodiment of the present disclosure.

FIG. 3 illustrates an operation of determining a synchronization relaying UE located out of a cellular network coverage area according to an embodiment of the present disclosure.

Referring to FIG. 3, a UE 310 located in a cellular network coverage area 302 formed by an eNB 300 is a first synchronization relaying UE, and a synchronization relaying UE may be determined from among UEs 312, 314, and 316 located out of the cellular network coverage area 302. In an embodiment of the present disclosure, it can be determined whether any one of the UEs 312, 314, and 316 will operate as a synchronization relaying UE, based on the control condition information that the eNB 300 has delivered to the UEs 312, 314, and 316 via the UE 310 located in the cellular network coverage area 302. The UEs 312, 314, and 316 located out of the cellular network coverage area 302 may receive a synchronization signal from the synchronization relaying UE 310 in the eNB 300, measure the state of the ambient signals and determine whether any one of the UEs 312, 314, and 316 is a synchronization relaying UE, depending on the given condition.

The UE 310 located in the cellular network coverage area 302 may be the first synchronization relaying UE, and a synchronization relaying UE (e.g., the UE 314), which is located out of the cellular network coverage area 302 and which directly receives a synchronization signal from the UE 310, may be a second synchronization relaying UE. The second synchronization relaying UE 314 may receive and relay a synchronization signal transmitted from the first synchronization relaying UE 310. Other UEs located out of the cellular network coverage area 302 may receive a synchronization signal from the first synchronization relaying UE 310 or the second synchronization relaying UE 314 to be synchronized with the first synchronization relaying UE 310 or the second synchronization relaying UE 314, and then initiate D2D communication.

Figure 4:
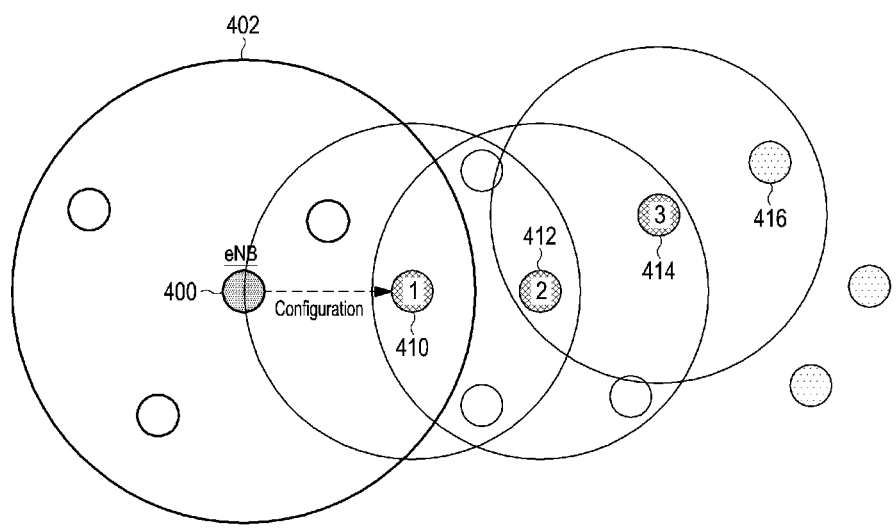
FIG. 4 illustrates a scenario where a synchronization relaying UE may not be determined out of a cellular network coverage area according to an embodiment of the present disclosure.

FIG. 4 illustrates a scenario where a synchronization relaying UE may not be determined out of a cellular network coverage area according to an embodiment of the present disclosure.

Referring to FIG. 4, a UE 410 located in a cellular network coverage area 402 formed by an eNB 400 may be a first synchronization relaying UE, and second and third synchronization relaying UEs 412 and 414 may exist out of the cellular network coverage area 402. The second synchronization relaying UE 412 may relay a synchronization signal from the first synchronization relaying UE 410, and the third synchronization relaying UE 414 may relay a synchronization signal from the second synchronization relaying UE 412. A synchronization reception UE 416 located in the vicinity of the third synchronization relaying UE 414 may receive a synchronization signal of the eNB 400 via the third synchronization relaying UE 414.

As illustrated, the multi-hop synchronization relaying UEs 410, 412, and 414 may be formed based on the control condition information received from the eNB 400. The eNB 400 may limit the maximum hop count based on the control condition information to prevent synchronization relaying UEs from being provided exceeding the maximum hop count. Even in this case, there is a need for a method in which UEs synchronized with the reference time of the eNB may reduce the interference from UEs non-synchronized with the reference time. In an embodiment of the present disclosure, a description will be made of a procedure related to an operation of delivering resource pool configuration information without the limitation on the maximum hop count so that the UEs that have received the resource pool configuration information may suppress the interference for the resource pool, which is received from the eNB.

In the case of FIGS. 3 and 4, since a synchronization signal from a UE located out of the cellular network coverage area needs to be received at a UE located in the cellular network coverage area, UEs located out of the cellular network coverage area may be fairly designed to be synchronization transmission UEs.

A description will now be made of an operating procedure for determining a synchronization relaying UE located in the cellular network coverage area.

1) The eNB may select a synchronization relaying UE without relying on the UE report. The eNB may select a synchronization relaying UE, upon receiving a report on emergency or disaster from an emergency control center, a Mobility Management Entity (MME), or another eNB. In an embodiment of the present disclosure, the eNB may select a synchronization relaying UE, based on the operating states of UEs located in the cellular network coverage area, e.g., based on whether each UE is in the RRC_CONNECTED state in which the UE has established a RRC connection to the eNB, or in the RRC_IDLE state in which the UE has not established a RRC_connection to the eNB. In an embodiment of the present disclosure, the eNB may select a synchronization relaying UE based on the power consumption of UEs so that the UEs located in the cellular network coverage area may play a role of a synchronization relaying UE in turn. In an embodiment of the present disclosure, the eNB may perform an operation of determining the duration in which a UE located in the cellular network coverage area operates as a synchronization relaying UE, based on the period for which UEs located out of the cellular network coverage area measure a synchronization signal, selecting the UE located in the cellular network coverage area as a synchronization relaying UE according thereto, and returning the role of a synchronization relaying UE.

2) The eNB may select a synchronization relaying UE based on the reports from UEs. In an embodiment of the present disclosure, the eNB may select a synchronization relaying UE based on the measurement results that UEs have reported periodically or according to the measurement instruction of the eNB. The UE may report to the eNB at least one of reception power of an eNB signal, a measurement result of a synchronization signal (or a synchronization signal that is received from an adjacent eNB or a synchronization transmission UE located out of the cellular network coverage area) which is not what the UE has received from the eNB to which the UE belongs, and a measurement result of a synchronization signal from a UE belonging to the same eNB.

For example, if a UE that is relatively close to a UE that is far from the eNB reports that the UE has received a synchronization signal from a synchronization transmission UE located out of the cellular network coverage area, the eNB may select the UE that is far from the eNB and instruct the selected UE to operate as a synchronization relaying UE. In addition, if multiple UEs that are far from the eNB make reports that the UEs have received a synchronization signal from a synchronization transmission UE located out of the cellular network coverage area (synchronization signal Identifiers (IDs) are included in the report contents), the eNB may group UEs having the same synchronization signal ID, select one UE from each group, and instruct the selected UE to operate as a synchronization relaying UE. In order to determine whether a synchronization signal from a synchronization relaying UE in each group is delivered to other UEs in each group, the eNB may wait for the next report, or instruct UEs in each group to measure a synchronization signal, and depending on the reports of the UEs (synchronization signal IDs are included in the report contents), the eNB may additionally instruct one of at least one UE, at which a synchronization signal from a synchronization relaying UE in each group has not arrived, to operate as a synchronization relaying UE.

The eNB may instruct UEs in the RRC_CONNECTED state, which are connected to the eNB, to measure a D2D synchronization signal. If necessary, the eNB may transition or switch an operation state of a UE in the RRC_IDLE state to the RRC_CONNECTED state through a paging procedure, and then instruct the UE in the RRC_CONNECTED state to measure a D2D synchronization signal.

3) A UE may transmit a request for a synchronization relaying operation to the eNB according to a certain determination condition or a determination condition specified by the eNB, and the eNB may select a synchronization relaying UE based on the request from the UE. The UE may determine whether to operate as a synchronization relaying UE, depending on reception power of an eNB signal, a measurement result of a synchronization signal (or a synchronization signal that is received from an adjacent eNB or a synchronization transmission UE located out of the cellular network coverage area) which is not what the UE has received from the eNB to which the UE belongs, and a measurement result of a synchronization signal from a UE belonging to the same eNB, and if the UE determines to operate as a synchronization relaying UE, the UE may transmit a request for a synchronization relaying operation to the eNB.

If reception power of an eNB signal (e.g., a synchronization signal or a reference signal) is less than particular reference power $X_1$ dBm, i.e., if it is determined that the UE is far away from the eNB, the UE may be spontaneously set to operate as a synchronization reference UE, since the synchronization signal of the eNB is low in reliability. Additionally, reception power condition for particular reference power $X_2$ dBm may be set, and if reception power of an eNB signal is less than $X_2$ dBm, the UE may transmit a request for a synchronization relaying operation to the eNB. In an embodiment of the present disclosure, $X_2$ may be greater in value than $X_1$. Like $X_1$, $X_2$ may be pre-configured, or may be configured by the eNB. The measurement period of reception power, in which $X_2$ and $X_1$ are to be compared, may also be pre-configured, or may be configured by the eNB.

The UE may perform a similar operation even for a signal from a synchronization reference UE. In other words, if reception power of a signal (e.g., a synchronization signal or a reference signal) from a synchronization reference UE is less than particular reference power $X_1$ dBm, i.e., if the UE is far away from the synchronization reference UE, the UE may be spontaneously set to operate as a synchronization reference UE, determining that the synchronization signal of the synchronization reference UE is low in reliability. Additionally, reception power condition for particular reference power $X_2$ dBm may be set, and if reception power of a signal from the synchronization reference UE is less than $X_2$ dBm, the UE may transmit a request for a synchronization relaying operation to the synchronization reference UE. In an embodiment of the present disclosure, $X_2$ may be greater in value than $X_1$. Like $X_1$, $X_2$ may be pre-configured, or may be configured by the eNB. The measurement period for $X_2$ and $X_1$ may also be pre-configured, or may be configured by the eNB, or the eNB may configure the measurement period through the synchronization reference UE.

The eNB may accept or reject the request of the UE, or instruct the UE to make a report, based on the network situation, the UE's capability, the fairness, and the like. The UE may transmit a request for a synchronization relaying operation to the eNB, when the UE is in either the RRC_CONNECTED state in which the UE is connected to the eNB or the RRC_IDLE state in which the UE is not connected to the eNB. In the RRC_CONNECTED state, the UE may receive information about a determination condition of the synchronization relaying operation from the eNB. In order to support a UE in the RRC_IDLE state, the eNB may broadcast information about a determination condition of the synchronization relaying operation over a Broadcast Channel (BCH). The information transmitted over the BCH may include indexes for a table having values of $X_1$ dBm and $X_2$ dBm or a variety of values. In addition, the BCH may include information about the measurement period for measuring reception power. Further, the eNB may broadcast, in the BCH, at least one of a synchronization cycle in the cellular network coverage area, location information of a synchronization signal resource, and measurement period. The UE may measure a synchronization signal that is transmitted from the eNB through the synchronization signal resource at each synchronization cycle, during the measurement period based on the information received over the BCH, and may transmit a request for a synchronization relaying operation to the eNB according to the results.

4) A UE may directly determine whether to operate as a synchronization relaying UE according to a certain determination condition or a determination condition specified by the eNB. The UE may determine whether to operate as a synchronization relaying UE, depending on reception power of an eNB signal, a measurement result of a synchronization signal (or a synchronization signal that is received from an adjacent eNB or a synchronization transmission UE located out of the cellular network coverage area) which is not what the UE has received from the eNB to which the UE belongs, and a measurement result of a synchronization signal from a UE belonging to the same eNB, and the UE may spontaneously determine whether to operate as a synchronization relaying UE.

If reception power of an eNB signal (e.g., a synchronization signal or a reference signal) is less than particular reference power $X_1$ dBm, i.e., if the UE is far away from the eNB, the UE may be spontaneously set to operate as a synchronization reference UE. Additionally, particular reference power $X_2$ dBm may be set, and if reception power of an eNB signal is less than $X_2$ dBm, the UE may determine to operate as a synchronization relaying UE. In an embodiment of the present disclosure, $X_2$ may be greater in value than $X_1$. Like $X_1$, $X_2$ may be pre-configured, or may be configured by the eNB. The measurement period for $X_2$ and $X_1$ may also be pre-configured, or may be configured by the eNB.

The UE may perform a similar operation even for a signal from a synchronization reference UE. In other words, if reception power of a signal (e.g., a synchronization signal or a reference signal) from a synchronization reference UE is less than particular reference power $X_1$ dBm, i.e., if the UE is far away from the synchronization reference UE, the UE may be spontaneously set to operate as a synchronization reference UE. Additionally, particular reference power $X_2$ dBm may be set, and if reception power of a signal from the synchronization reference UE is less than $X_2$ dBm, the UE may determine to operate as a synchronization relaying UE. In an embodiment of the present disclosure, $X_2$ may be greater in value than $X_1$. Like $X_1$, $X_2$ may be pre-configured, or may be configured by the eNB, or the eNB may configure the $X_2$ through the synchronization reference UE. The measurement period for $X_2$ and $X_1$ may also be pre-configured, or may be configured by the eNB.

The UE may spontaneously determine whether to operate as a synchronization relaying UE, when the UE is in either the RRC_CONNECTED state in which the UE is connected to the eNB or the RRC_IDLE state in which the UE is not connected to the eNB. In the RRC_CONNECTED state, the UE may receive information about a determination condition of the synchronization relaying operation from the eNB. In order to support a UE in the RRC_IDLE state, the eNB may broadcast information about a determination condition of the synchronization relaying operation over a BCH. The information transmitted over the BCH may include indexes for a table having values of $X_1$ dBm and $X_2$ dBm or a variety of values. In addition, the BCH may include information about the measurement period for measuring reception power. Further, the eNB may broadcast, in the BCH, at least one of a synchronization cycle in the cellular network coverage area, location information of a synchronization signal resource, and measurement period. The UE may measure a synchronization signal that is transmitted from the eNB through the synchronization signal resource at each synchronization cycle, during the measurement period based on the information received over the BCH, and may determine whether to play a role of a synchronization relaying UE according to the results.

Since transmission power of the eNB is different from transmission power of the UE, a value of $X_2$ dBm may be configured as another value with respect to a synchronization signal of the eNB and a synchronization signal of the UE. In addition, in order to make a UE as a synchronization relaying UE in the eNB coverage area, $X_2$ dBm may be defined as a determination condition with respect to a synchronization signal of the eNB, and since the synchronization transmission UE does not need to make a synchronization relaying UE in the eNB coverage area, it is possible to define $X_1$ dBm as a determination condition with respect to a synchronization signal of the UE.

A description will now be made of an operating procedure for determining a synchronization relaying UE located out of the cellular network coverage area.

If a D2D UE (e.g., a cellular UE or a D2D-dedicated UE) located out of the cellular network coverage area receives a synchronization signal and/or a synchronization channel of a synchronization relaying UE having the reference time of the eNB, and the relay hop count of the synchronization relaying UE has not reached the maximum relay hop count, the D2D UE may be a candidate (referred to as a synchronization relaying candidate) that can be a synchronization relaying UE. The D2D UE may identify the hop count for the eNB to which the synchronization relaying UE belongs and the synchronization relaying UE, from the synchronization signal or the synchronization channel. Since the D2D UE is not connected to the eNB, the D2D UE should spontaneously determine whether to operate as a synchronization relaying UE.

The D2D UE that has received a synchronization signal and a synchronization channel from the synchronization relaying UE having an N-th hop may be a synchronization relaying UE that has an (N+1)-th hop based on the measurement period and the determination condition. The measurement period and the determination condition may be pre-set, or may be acquired from the synchronization channel that the synchronization relaying UE has received from the eNB and relayed the received synchronization channel. If multiple UEs satisfying the determination condition are present in the same area, unnecessarily many synchronization relaying UEs may be provided. If multiple synchronization relaying UEs transmit a synchronization signal and a synchronization channel at the same time, interference may occur. To address this issue, the UE may determine whether to operate as a synchronization relaying UE depending on the number of times that the UE has received a synchronization signal and a synchronization channel from the synchronization relaying UE having the same hop as the hop (e.g., an (N+1)-th hop) that belongs to the same eNB and desires to be a synchronization relaying candidate.

In an embodiment of the present disclosure, after receiving a synchronization channel related to a synchronization signal from a synchronization relaying UE having an N-th hop, the D2D UE may identify an eNB ID and the hop count of the synchronization relaying UE, which are included in the synchronization channel, and may also determine measurement time information that specifies a measurement cycle of a synchronization signal and a measurement period in one cycle. If the eNB ID is not included in the synchronization channel, the D2D UE may perform a synchronization operation between UEs located out of the cellular network coverage area. The D2D UE may periodically measure the synchronization signal during the measurement period. If a synchronization signal and a synchronization channel from another synchronization relaying UE having the same (or greater) hop as the (N+1)-th hop are received together with a synchronization signal and a synchronization channel from an N-hop synchronization relaying UE, the D2D UE may determine that the D2D UE does not need to be a synchronization relaying candidate. Otherwise, the D2D UE may measure the (average or total) reception power for the synchronization signal from the (at least one) synchronization relaying UE having the N-th hop during the measurement period, and if the measurement result is greater than $X_1$ dBm and less than $X_2$ dBm ($X_1<X_2$), the D2D UE may operate as a synchronization relaying UE having an (N+1)-th hop.

In an embodiment of the present disclosure, only if it is determined from the synchronization measurement result that a synchronization signal having an eNB ID other than the eNB ID delivered from an N-hop synchronization relaying UE, or having a UE ID of a synchronization transmission UE located out of the cellular network coverage area is received, the D2D UE may determine whether to be a synchronization relaying candidate. In this case, it is necessary to prevent one or more synchronization relaying candidates from being synchronization relaying UEs at the same time. Each D2D UE that has received a synchronization signal and/or a synchronization channel from a synchronization relaying UE having an N-th hop may determine whether to be a synchronization relaying UE by additionally performing synchronization measurement during an arbitrary additional measurement period after the measurement period specified by the synchronization channel. Since the additional measurement period is arbitrarily set in each D2D UE, the additional measurement period may be determined to be different among D2D UEs, if possible. In an embodiment of the present disclosure, each D2D UE may add an arbitrary time offset to a starting point of the measurement period specified by the synchronization channel, thereby making it possible to start the synchronization measurement in different measurement periods.

In determining a synchronization transmission UE, it is possible to determine the synchronization transmission UE based on X dBm for reception power of a synchronization signal. A frequent determination and return operation of a synchronization transmission UE may occur at the boundary of X dBm. Specifically, upon detecting a synchronization signal of X dBm or more, a synchronization reference UE located out of the cellular network coverage area may be changed to a synchronization relaying UE, and if the synchronization relaying UE measures synchronization signal's reception power which is less than X dBm, the synchronization relaying UE may be changed to a synchronization reference UE. Therefore, if frequent role change happens at the boundary of X dBm, operations of adjacent other D2D UEs may be disrupted.

Figure 5A:
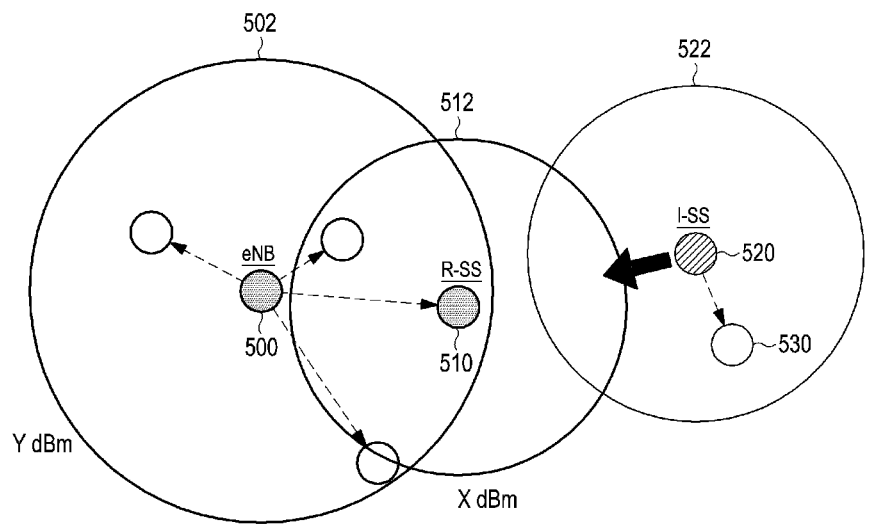
FIGS. 5A, 5B, and 5C illustrate a scenario where a synchronization reference UE enters cellular network coverage area according to various embodiments of the present disclosure.
Figure 5B:
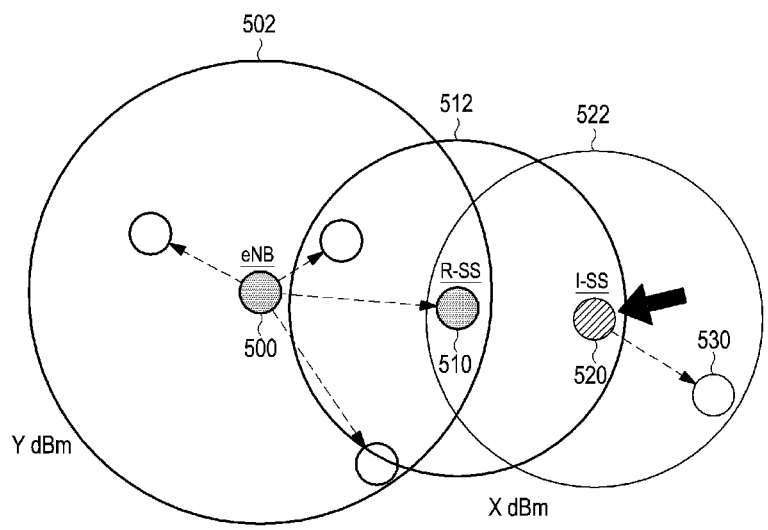
Figure 5C:
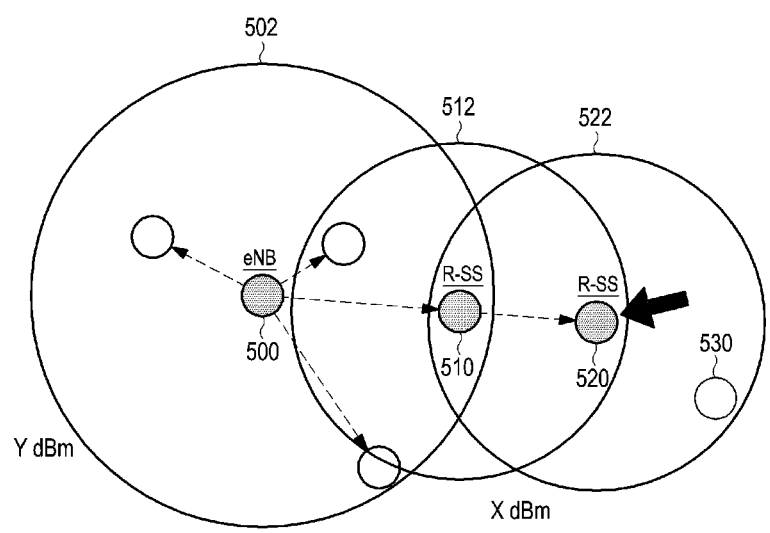

FIGS. 5A, 5B, and 5C illustrate a scenario where a synchronization reference UE enters cellular network coverage area according to various embodiments of the present disclosure.

Referring to FIG. 5A, a UE 510 located in a cellular network coverage area 502 formed by an eNB 500 is operating as a 2-hop synchronization relaying UE (i.e., R-SS), and a synchronization reference UE 520 may exist out of the cellular network coverage area 502. The synchronization reference UE 520 may transmit the synchronization signal of the synchronization reference UE 520 in the state where the synchronization reference UE 520 cannot detect a synchronization signal from the eNB 500 or the synchronization relaying UE 510. A synchronization reception UE 530 may exist in a coverage area 522 where the synchronization reception UE 530 can receive a synchronization signal from the synchronization reference UE (i.e., I-SS) 520.

Referring to FIG. 5B, the synchronization reference UE 520 located out of the cellular network coverage area 502 may move into coverage area 512 where the synchronization reference UE 520 can detect a synchronization signal of the synchronization relaying UE 510. However, the synchronization reference UE 520 may still transmit the synchronization signal of the synchronization reference UE 520 while reception power of the synchronization signal from the synchronization relaying UE 510 is less than X dBm.

Referring to FIG. 5C, if the reception power of the synchronization signal from the synchronization relaying UE 510 is greater than or equal to X dBm as the synchronization reference UE 520 enters more deeply into the coverage area 512 of the synchronization relaying UE 510, the synchronization reference UE 520 may relay the synchronization signal that is delivered from the eNB 500 through the 2-hop synchronization relaying UE 510, to the synchronization reception UE 530, by changing the role of the synchronization reference UE 520 as a 3-hop synchronization relaying UE.

Since the reception performance of the synchronization signal is not guaranteed in the synchronization relaying UE 520 due to the nature of the wireless media, the synchronization relaying UE 520 may frequently perform role switching between a synchronization transmission UE and a synchronization relaying UE.

A description will now be made of embodiments in which $X_1$ dBm is defined as a condition for a synchronization relaying UE with respect to reception power from a synchronization relaying UE when a UE located in the cellular network coverage area enters the coverage area of the synchronization relaying UE, and $X_2$ dBm is defined as a condition for role return with respect to reception power from a previous-hop synchronization relaying UE when the synchronization relaying UE enters out of the cellular network coverage area.

FIGS. 6A, 6B, 6C, and 6D illustrate an operation of returning a role of a synchronization reference UE according to various embodiments of the present disclosure. Shown herein is an operation of returning the role of a synchronization reference UE according to two reception power conditions $X_1$ and $X_2$.

Figure 6A:
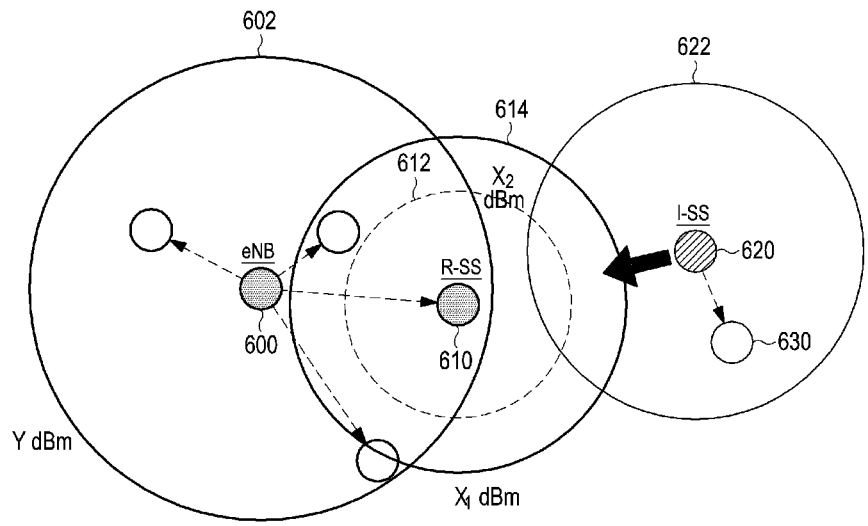
FIGS. 6A, 6B, 6C, and 6D illustrate an operation of returning a role of a synchronization reference UE according to various embodiments of the present disclosure.

Referring to FIG. 6A, a UE 610 located in a cellular network coverage area 602 formed by an eNB 600 is operating as a 2-hop synchronization relaying UE (i.e., R-SS), and a synchronization reference UE 620 may exist out of the cellular network coverage area 602. The synchronization reference UE 620 may transmit the synchronization signal of the synchronization reference UE 620 in the state where the synchronization reference UE 620 cannot detect a synchronization signal from the eNB 600 or the synchronization relaying UE 610. A synchronization reception UE 630 may exist in a coverage area 622 where the synchronization reception UE 630 can receive a synchronization signal from the synchronization reference UE (i.e., I-SS) 620.

Figure 6B:
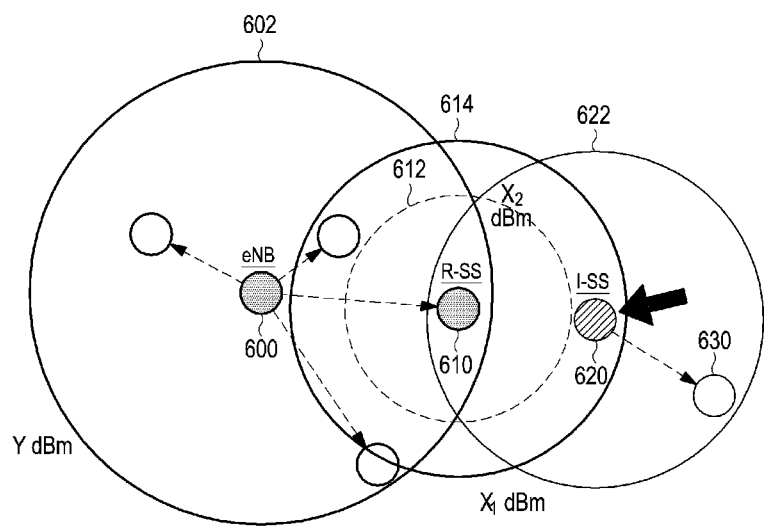

Referring to FIG. 6B, the synchronization reference UE 620 located out of the cellular network coverage area 602 may move into coverage area 614 where the synchronization reference UE 620 can detect a synchronization signal of the synchronization relaying UE 610. However, the synchronization reference UE 620 may still transmit the synchronization signal of the synchronization reference UE 620 while reception power of the synchronization signal from the synchronization relaying UE 610 is less than $X_1$ dBm. At this time, the synchronization reference UE 620 may be a synchronization relaying candidate, and may continuously measure reception power of the synchronization signal from the synchronization relaying UE 610, reserving the switching of the synchronization reference UE 620 to a synchronization relaying UE.

Figure 6C:
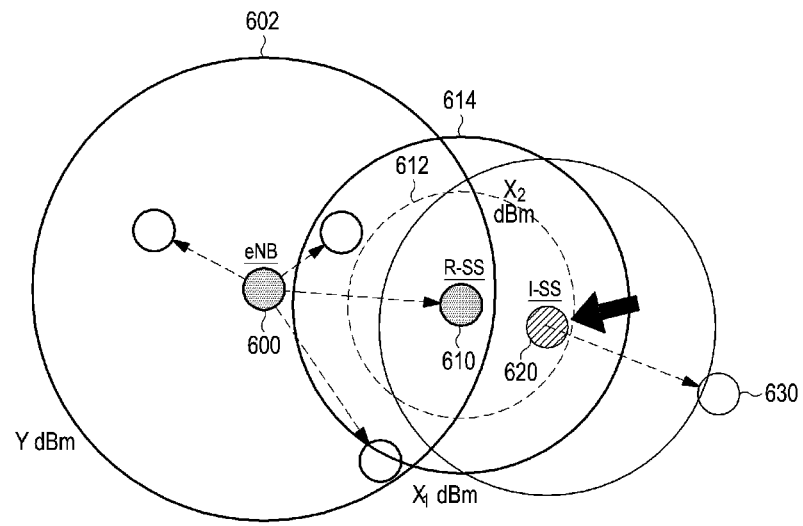
Figure 6D:
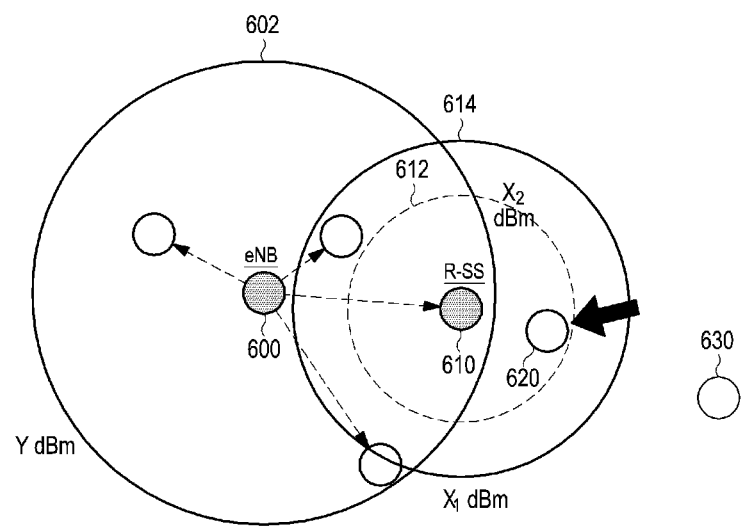

Referring to FIGS. 6C and 6D, if the synchronization reference UE 620 enters a coverage area 612 where reception power of a synchronization signal from the synchronization relaying UE 610 is greater than or equal to $X_2$ dBm as the synchronization reference UE 620 approaches closer to the synchronization relaying UE 610 as illustrated in FIG. 6C, the synchronization reference UE 620 may return the role of a synchronization reference UE and follow the synchronization of the eNB 600, as illustrated in FIG. 6D. In other words, the UE 620 may no longer transmit the synchronization signal of the synchronization reference UE 620 and operates as a synchronization reception UE. After the synchronization reception UE 630 can no longer receive the synchronization signal from the synchronization reference UE 620, the synchronization reception UE 630 may search for another synchronization reference UE or synchronization relaying UE, or switch to a new synchronization reference UE 620.

Whether the UE 620 that has returned the role of a synchronization reference UE is to be a synchronization relaying UE may be determined based on other determination conditions described in an embodiment of the present disclosure.

Figure 7A:
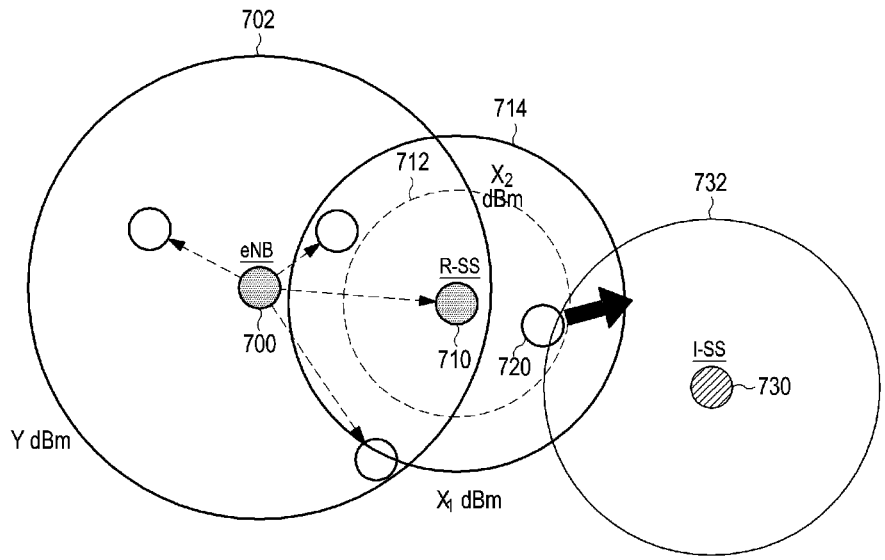
FIGS. 7A, 7B, and 7C illustrate an operation of returning a role of a synchronization relaying UE according to various embodiments of the present disclosure.
Figure 7B:
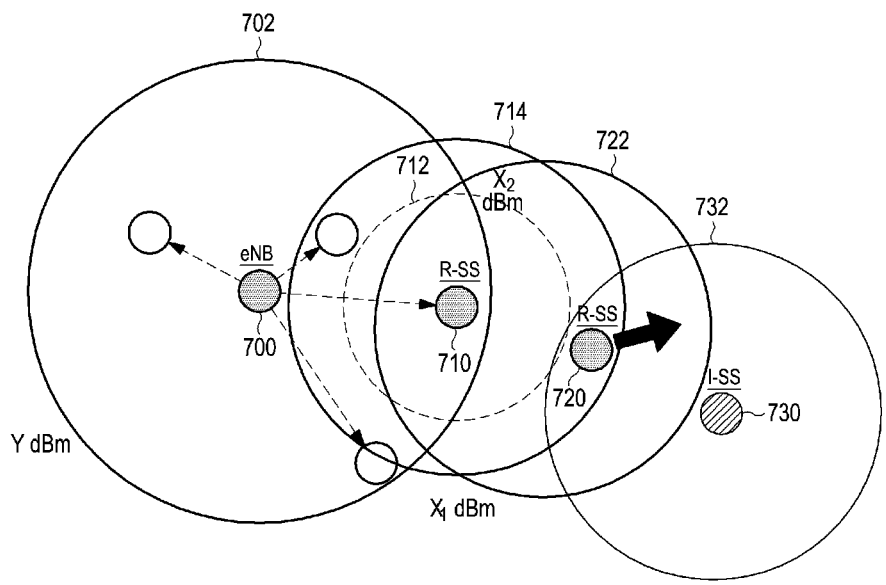
Figure 7C:
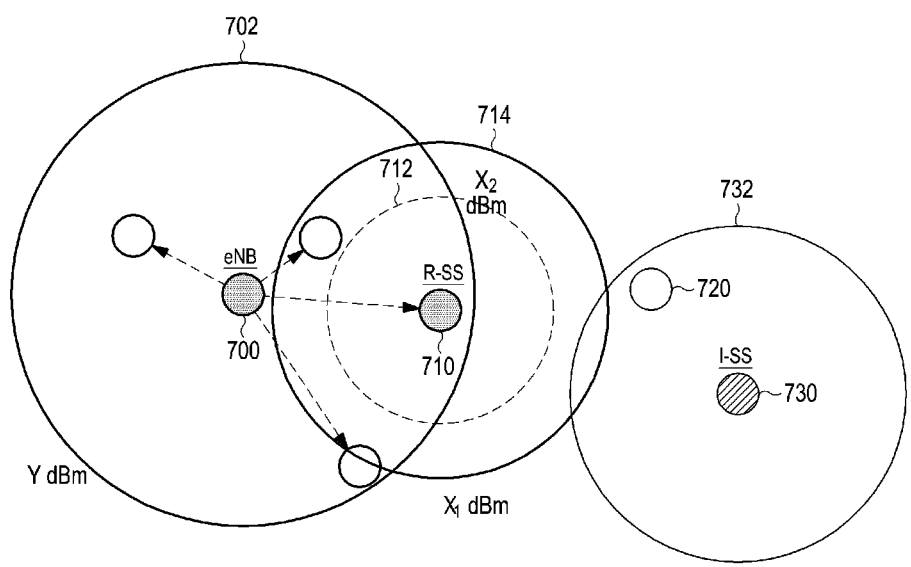

FIGS. 7A, 7B, and 7C illustrate an operation of returning a role of a synchronization relaying UE according to various embodiments of the present disclosure. Shown herein is an operation of returning the role of a synchronization relaying UE according to two reception power conditions $X_1$ dBm and $X_2$ dBm.

Referring to FIG. 7A, a UE 710 located in a cellular network coverage area 702 formed by an eNB 700 is operating as a 2-hop synchronization relaying UE (i.e., R-SS), and a UE 720, though the UE 720 is located out of the cellular network coverage area 702, may acquire an eNB reference time as the UE 720 is located in a coverage area 712 where the UE 720 can receive a synchronization signal and a synchronization channel relayed by the synchronization relaying UE 710 with reception power of $X_2$ dBm or more.

Referring to FIG. 7B, if reception power of a synchronization signal from the synchronization relaying UE 710 is less than $X_2$ dBm as the UE 720 moves out of the coverage area 712, the UE 720 may operate as a 3-hop synchronization relaying UE according to a certain determination condition.

Referring to FIG. 7C, if the new synchronization relaying UE 720 moves out of the coverage area 714 where the new synchronization relaying UE 720 can receive a synchronization signal from the synchronization relaying UE 710 with reception power of $X_1$ dBm or more as the new synchronization relaying UE 720 continuously moves, the synchronization relaying UE 720 may return the role of a synchronization relaying UE. Upon returning the role of a synchronization relaying UE, the UE 720 may stop the relaying of the synchronization signal. Thereafter, if the UE 720 detects a synchronization signal from a synchronization reference UE 730 by searching for a synchronization signal from the surroundings, the UE 720 may operate as a synchronization reception UE instead of operating as a new synchronization reference UE. The UE 720 may receive a synchronization signal from the synchronization reference UE 730 while the UE 720 is located in a coverage area 732 of the synchronization reference UE 730.

Figure 8A:
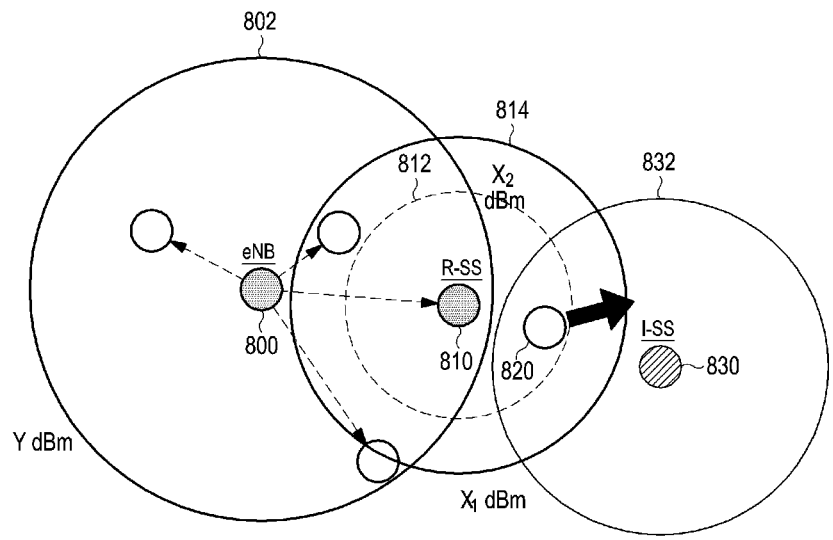
FIGS. 8A, 8B, and 8C illustrate an operation of returning a role of a synchronization relaying UE according to various embodiments of the present disclosure.
Figure 8B:
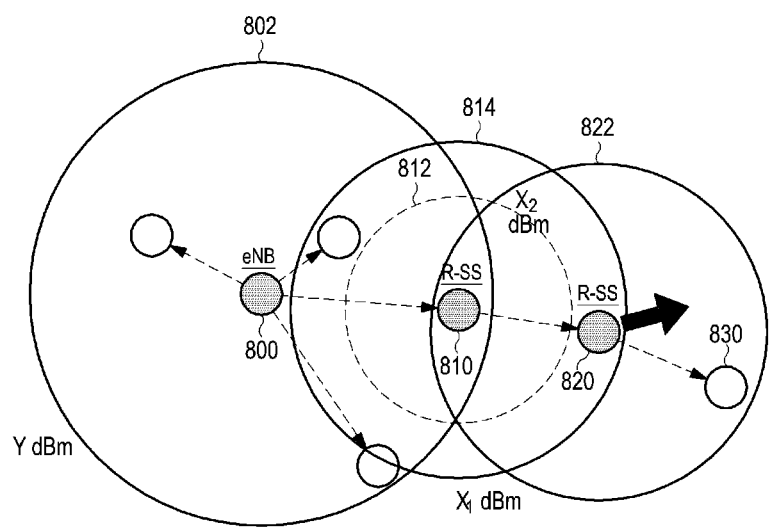
Figure 8C:
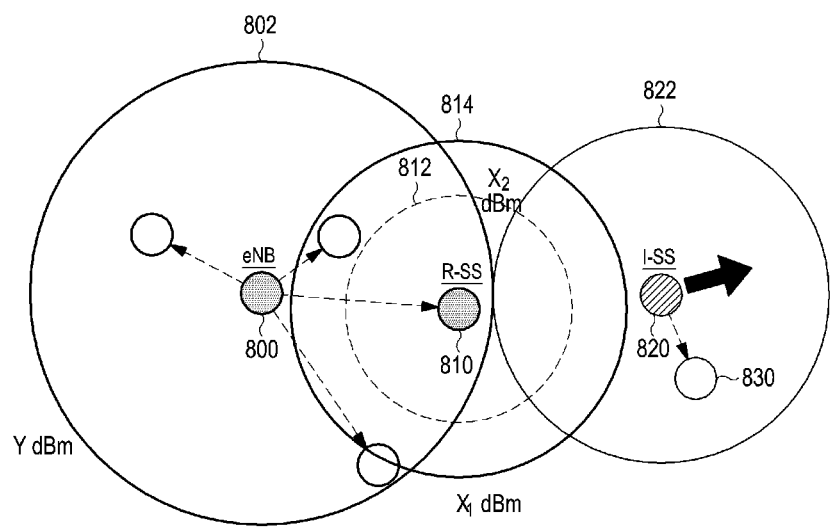

FIGS. 8A, 8B, and 8C illustrate an operation of returning a role of a synchronization relaying UE according to various embodiments of the present disclosure.

Referring to FIG. 8A, a UE 810 located in a cellular network coverage area 802 formed by an eNB 800 is operating as a 2-hop synchronization relaying UE (i.e., R-SS), and a UE 820, though the UE 820 is located out of the cellular network coverage area 802, may acquire an eNB reference time as the UE 820 is located in a coverage area 812 where the UE 820 can receive a synchronization signal and a synchronization channel relayed by the synchronization relaying UE 810 with reception power of $X_2$ dBm or more. A UE 830 located in a coverage area 832 of the UE 820 may acquire eNB reference time via the UE 820.

Referring to FIG. 8B, if reception power of a synchronization signal from the synchronization relaying UE 810 is less than $X_2$ dBm as the UE 820 moves out of the coverage area 812, the UE 820 may operate as a 3-hop synchronization relaying UE according to a certain determination condition. A UE 830 located in a coverage area 822 of a new synchronization relaying UE 820 may acquire eNB reference time via the synchronization relaying UE 820.

Referring to FIG. 8C, if the new synchronization relaying UE 820 moves out of the coverage area 814 where the synchronization relaying UE 820 can receive a synchronization signal from the synchronization relaying UE 810 with reception power of $X_1$ dBm or more as the synchronization relaying UE 820 continuously moves, the synchronization relaying UE 820 may return the role of a synchronization relaying UE. After returning the role of a synchronization relaying UE, the UE 820 may determine whether to operate as a new synchronization reference UE if the UE 820 fails to detect a synchronization signal from the synchronization reference UE by searching for a synchronization signal from the surroundings. The UE 830 may receive a synchronization signal from the new synchronization reference UE 820 while the UE 830 is located in a coverage area 822 of the new synchronization reference UE 820.

Although an embodiment of using two reception power conditions of $X_1$ dBm and $X_2$ dBm has been described above, an operation of using $X_2$ dBm and a margin value $\Delta$ dBm, or using $X_1$ dBm and a timer is also possible. In an example of using the margin value $\Delta$ dBm, it is possible to define $(X_2+\Delta)$ dBm as a determination condition for a synchronization relaying UE with respect to reception power from the synchronization relaying UE when a UE located out of a cellular network coverage area enters a coverage area of the synchronization relaying UE, and it is possible to define $(X_2-\Delta)$ dBm as a determination condition for role return when the synchronization relaying UE moves out of the cellular network coverage area. On the contrary, it is possible to define $(X_2-\Delta)$ dBm as a determination condition for a synchronization relaying UE with respect to reception power from the synchronization relaying UE when a UE located out of a cellular network coverage area enters a coverage area of the synchronization relaying UE, and it is possible to define $(X_2+\Delta)$ dBm as a determination condition for role return when the synchronization relaying UE moves out of the cellular network coverage area. By considering both of the above two examples, it is possible to define $X_2$ dBm as a determination condition for a synchronization relaying UE with respect to reception power from the synchronization relaying UE when a UE located out of a cellular network coverage area enters a coverage area of the synchronization relaying UE, and it is possible to define a case where reception power from the synchronization relaying UE is greater than $(X_2+\Delta)$ dBm or less than $(X_2-\Delta)$ dBm, as a determination condition for role return when the synchronization relaying UE moves out of the cellular network coverage area. In an example of using a timer, it is possible to define, as a determination condition for a synchronization relaying UE, a case where a UE located out of a cellular network coverage area starts a timer when reception power from the synchronization relaying UE is greater than or equal to $X_1$ dBm and the reception power is maintained at $X_1$ dBm or greater until the timer expires, or it is possible to define, as a determination condition for a synchronization relaying UE, a case where the synchronization relaying UE starts a timer after returning the role of a synchronization relaying UE and the reception power is maintained at $X_1$ dBm or greater after the timer expires.

It is possible to define, as a determination condition for role return, a case where a synchronization relaying UE starts a timer when reception power from a previous-hop synchronization relaying UE is less than $X_1$ dBm and the reception power is maintained at $X_1$ dBm or below until the timer expires, or it is possible to define, as a determination condition for role return, a case where the synchronization relaying UE starts a timer and the reception power is reduced to $X_1$ dBm or below after the timer expires.

In an embodiment of the present disclosure, it is possible to use a timer, $X_1$ dBm and $X_2$ dBm, or to use a timer, $X_2$ dBm and a margin value $\Delta$ dBm. The timer may be a specific fixed period determined by the system, or a variable period that can be controlled by the eNB.

A description will now be made of an operating procedure for failing to determine a synchronization relaying UE located out of the cellular network coverage area.

In a case where synchronization relaying UEs are configured in a multi-hop manner based on the control condition information delivered from the cellular network, no more synchronization relaying UEs may be made due to the limitation of the maximum hop count. However, even in this case, there is a need for a method in which UEs synchronized with the reference time of the eNB may reduce the interference from UEs non-synchronized with the reference time. Information about a resource pool used for interference control and information about a temporal position of the resource pool are needed. D2D resource pool configuration information allocated by the eNB may include the period and size of a D2D control channel resource, the period and size of a D2D data channel resource, and the period and size of a D2D synchronization resource. A UE located out of a cellular network coverage area, which receives a synchronization signal from a synchronization relaying UE located in the cellular network coverage area or a multi-hop synchronization relaying UE, which delivers or relays the reference time of the eNB, may determine the maximum hop count, information about which is included in the connected synchronization channel, and describe an operation in a case where the hop count has reached the maximum hop count. In this case, though the UE located out of the cellular network coverage area has received a synchronization signal, since the hop count exceeds the maximum hop count, the reference time may not match. Even though the reference time does not match, the UE located out of the cellular network coverage area may acquire D2D resource pool configuration information through reception of a connected synchronization channel while receiving a synchronization signal. A synchronization transmission UE located out of the cellular network coverage area may deliver the D2D resource pool configuration information to a UE belonging thereto, or adjacent another synchronization transmission UE. The UE located out of the cellular network coverage area may calculate a time difference with the received eNB reference time with relatively rough accuracy to readjust the reference time so as to avoid the D2D resource pool allocated from the eNB and the D2D resource pool that is used by a UE located out of the cellular network coverage area. Alternatively, the control signal may be transmitted and received in the same D2D resource pool only for the case where a synchronization method capable of increasing the accuracy is used, making it possible to enable an integrated operation.

The present disclosure may provide efficient and stable synchronization for a D2D network, and may also expect to avoid the interference between UEs and improve the communication performance in point-to-point or point-to-multipoint communication.

Figure 9:
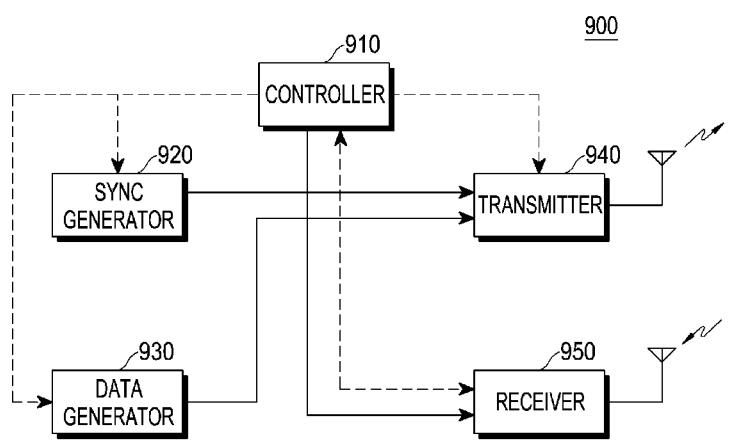
FIG. 9 illustrates a configuration of a UE according to an embodiment of the present disclosure.

FIG. 9 illustrates a configuration of a UE according to an embodiment of the present disclosure.

Referring to FIG. 9, a UE 900 may include a synchronization generator 920 for generating a synchronization signal and/or a synchronization channel for D2D communication, a data generator 930 for generating a data message for D2D communication, a transmitter 940 for transmitting a signal for D2D communication, a receiver 950 for receiving a signal for D2D communication, and a controller 910 for controlling the overall operation of the UE 900.

If the UE 900 operates as a synchronization reference UE, the synchronization generator 920 may generate the synchronization signal of the synchronization generator 920 and synchronization channel. If the UE 900 operates as a synchronization relaying UE, the synchronization generator 920 may receive synchronization information that is based on the synchronization signal and synchronization channel received by the receiver 950, from the controller 910, and generate a synchronization signal and a synchronization channel according to the previous-hop synchronization relaying UE (or the eNB). The controller 910 may determine an operation mode of the UE 900 according to the measurement result of the synchronization signal by the receiver 950 and the control condition information acquired through the synchronization channel, and may control the synchronization generator 920, the transmitter 940 and the receiver 950.

In an embodiment of the present disclosure, all operations for the above synchronization support may be construed to be performed by the controller 910. However, the controller 910, the synchronization generator 920, the data generator 930, the transmitter 940 and the receiver 950 should not necessarily be implemented as separate components, but they may be implemented as one component in the form of a single chip.

Figure 10:
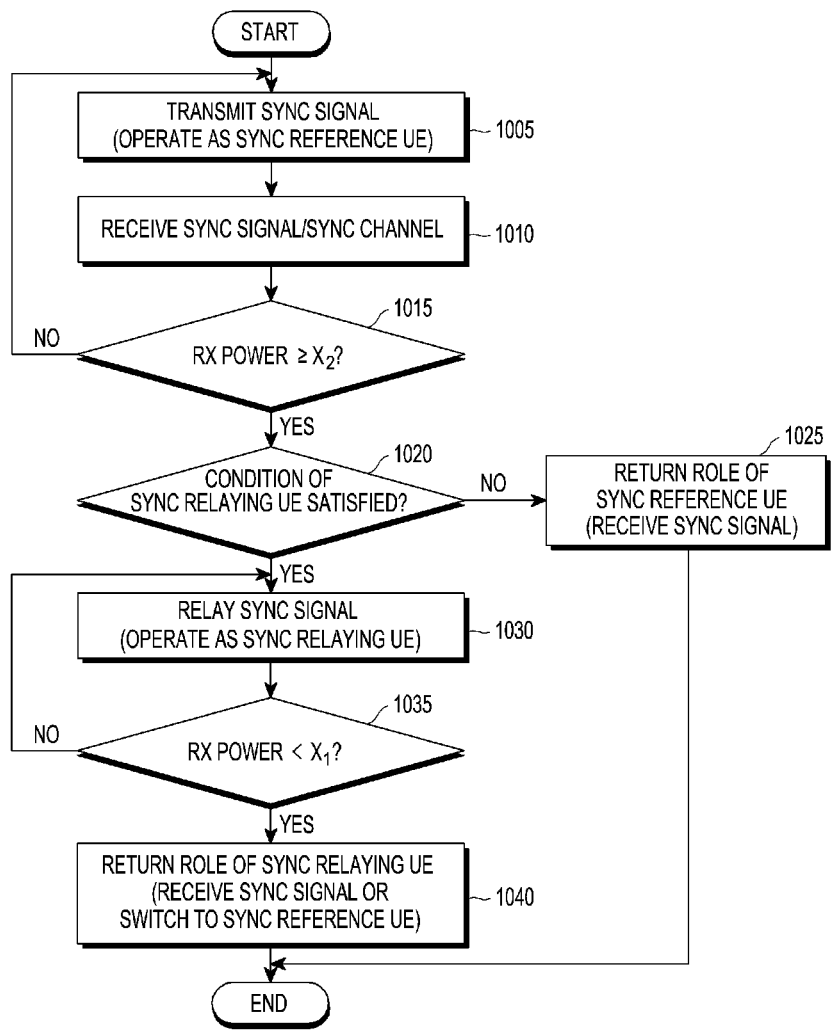
FIG. 10 is a flowchart illustrating an operation of a UE according to an embodiment of the present disclosure.

FIG. 10 is a flowchart illustrating an operation of a UE according to an embodiment of the present disclosure.

Referring to FIG. 10, in operation 1005, the UE, which is operating as a synchronization reference UE, may transmit the synchronization signal of the UE. In operation 1010, the UE may detect a synchronization signal from another synchronization source (e.g., an eNB or another synchronization reference UE), and receive the synchronization signal and the associated synchronization channel of the UE. The UE may determine in operation 1015 whether reception power of the synchronization signal is greater than or equal to a certain reference power $X_2$. If the reception power is less than $X_2$, the UE may return to operation 1005 and continuously operate as a synchronization reference UE.

On the other hand, if the reception power is greater than or equal to $X_2$, the UE may determine in operation 1020 whether a switching condition to a synchronization relaying UE is satisfied. As an example, the switching condition may include a condition that the hop count of a synchronization source that has transmitted the detected synchronization signal is less than the maximum hop count, and a condition that a condition that there is no nearby other synchronization source, the hop count of which is greater than the hop count of the synchronization source that has transmitted the detected synchronization signal. As another example, the switching condition may further include a condition that the reception power is maintained at $X_2$ or higher for a certain time interval.

If the switching condition is not satisfied, the UE may return the role of a synchronization reference UE and determine whether to operate as a synchronization reception UE that receives a synchronization signal, in operation 1025. On the other hand, if the switching condition is satisfied, the UE may return the role of a synchronization reference UE and start operating as a synchronization relaying UE that relays a synchronization signal received from the synchronization source, in operation 1030.

In operation 1035, the UE may continuously monitor whether reception power of a synchronization signal received from the previous-hop synchronization source is less than a certain reference power $X_1$, while operating as a synchronization relaying UE. If the reception power is less than $X_1$, the UE may return the role of a synchronization relaying UE, and may be a synchronization reception UE that receives a synchronization signal, or switch to a synchronization reference UE depending on the given condition, in operation 1040.

A description will now be made of a procedure for controlling a transmission operation of a UE based on interference between D2D synchronization signals in a partial network.

Figure 11:
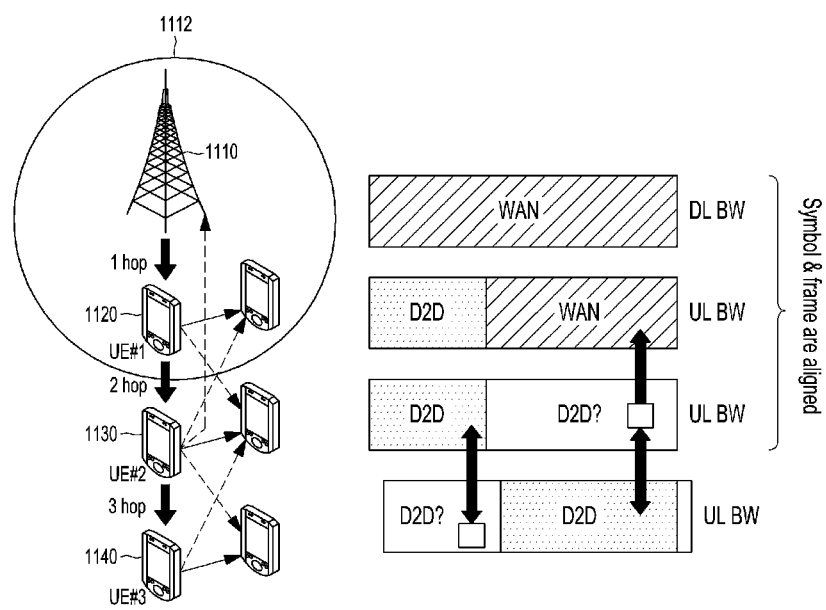
FIG. 11 illustrates a scenario where interference occurs in a case where a maximum hop count is 3 in a partial network scenario according to an embodiment of the present disclosure.

FIG. 11 illustrates a scenario where interference occurs in a case where a maximum hop count is 3 in a partial network scenario according to an embodiment of the present disclosure.

Referring to FIG. 11, a UE#1 1120 may exist in a cellular network coverage area 1112 (e.g., a cell) formed by an eNB 1110, and a UE#2 1130 and a UE#3 1140 may exist out of the cellular network coverage area 1112. The eNB 1110 may use a Wide Area Network (WAN) resource pool for cellular communication as a Downlink Bandwidth (DL BW), and the UE#1 to UE#3 1120, 1130 and 1140 may use at least a portion of the downlink bandwidth, for D2D communication. The UE#1 1120 and the UE#2 1130 may operate as synchronization relaying UEs that relay a synchronization signal that follows the eNB reference time. Since the relay structure has reached the maximum hop count of 3, the UE#3 1140 may not follow the eNB reference time.

Since the UE#1 1120 is directly controlled by the eNB 1110, interference from the UE#1 1120 may be managed by the eNB 1110. The UE#1 1120 and the UE#2 1130 may have the synchronized reference time, and may also manage mutual interference through a D2D control channel by aligning the D2D resource pool.

However, since the UE#3 1140 has not been synchronized with the eNB 1110 and the UEs 1120 and 1130 due to the limitation of the maximum hop count, if the UE#3 1140 shares resources with the UE#2 1130 in the D2D resource pool known by the eNB 1110, it is not possible to manage interference. For the same reason, if the UE#2 1130 transmits data using resource in a resource pool other than the D2D resource pool known by the eNB 1110, it may cause interference to the eNB 1110 or the UE that receives data of the UE#3 1140.

Figure 12:
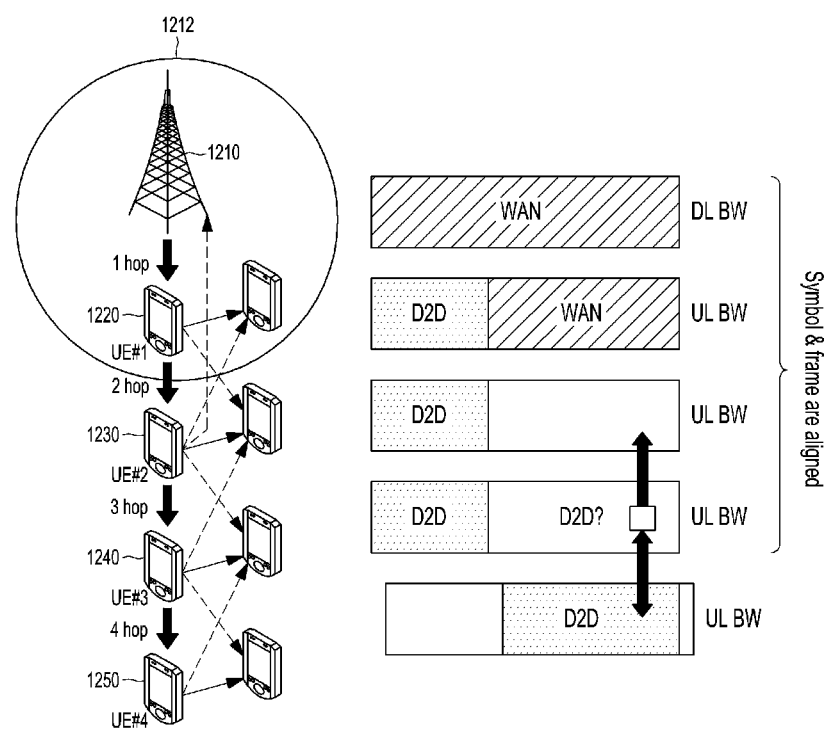
FIG. 12 illustrates a scenario where interference occurs in a case where a maximum hop count is 4 in a partial network scenario according to an embodiment of the present disclosure.

FIG. 12 illustrates a scenario where interference occurs in a case where a maximum hop count is 4 in a partial network scenario according to an embodiment of the present disclosure.

Referring to FIG. 12, a UE#1 1220 may exist in a cellular network coverage area 1212 (e.g., a cell) formed by an eNB 1210, and a UE#2 1230, a UE#3 1240, and a UE#4 1250 may exist out of the cellular network coverage area 1212.

The eNB 1210 may use a WAN resource pool for cellular communication as a downlink bandwidth, and the UE#1 to UE#4 1220, 1230, 1240, and 1250 may use at least a portion of the downlink bandwidth, for D2D communication. The UE#1 to UE#3 1220, 1230, and 1240 may operate as synchronization relaying UEs that relay a synchronization signal that follows the eNB reference time. Since the relay structure has reached the maximum hop count of 4, the UE#4 1250 may not follow the eNB reference time.

Similarly, if the UE#3 1240 transmits a signal in a resource that the eNB 1210 has not allocated with a D2D resource pool, it may cause interference to the UE (e.g., the UE located out of the cellular network coverage area) that receives a signal of the UE#4 1250.

In order to address the interference issue, the present disclosure proposes the following operations.

1) The eNB may transmit D2D resource pool information over a synchronization channel or another channel, and the D2D resource pool information may be relayed via a synchronization relaying UE.

2) A UE that follows the eNB reference time, among the D2D UEs that have received a synchronization signal relayed from the eNB and received the D2D resource pool information, may perform a transmission operation in the D2D resource pool indicated by the D2D resource pool information.

3) A UE that does not follow the eNB reference time, among the D2D UEs that have received a synchronization signal relayed from the eNB and received the D2D resource pool information, may perform a transmission operation in a resource pool other than the D2D resource pool indicated by the D2D resource pool information. In an embodiment of the present disclosure, the D2D resource pool and another resource pool other than the D2D resource pool may overlap partially or wholly in terms of time. This is because the resource pool that is understood by the UE that does not follow the eNB reference time may not be the same as the resource pool that is understood by the UE that follows the eNB reference time, in terms of the absolute time.

Figure 13:
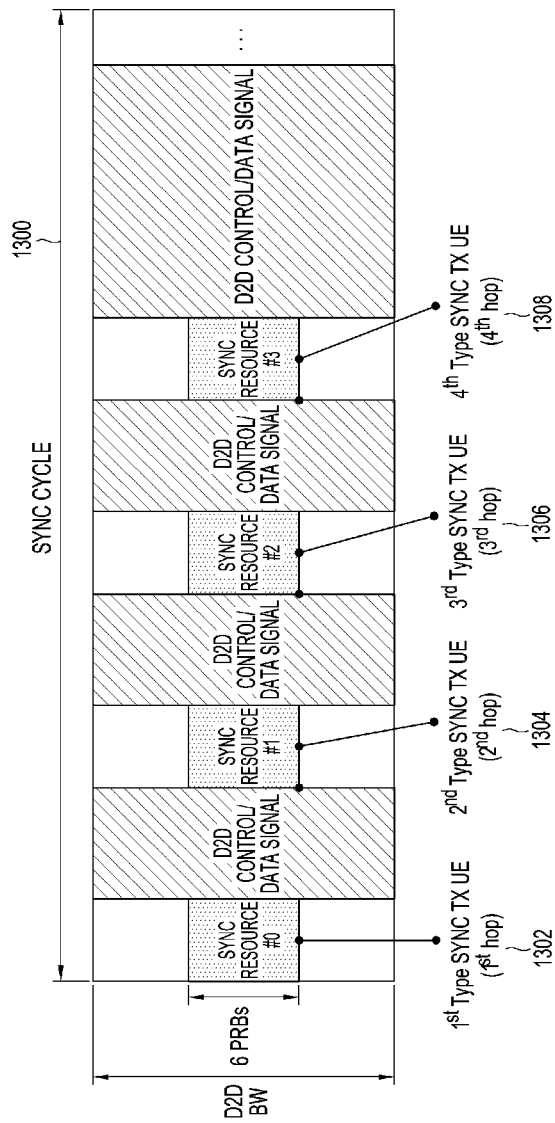
FIG. 13 illustrates a synchronization resource structure according to an embodiment of the present disclosure.

FIG. 13 illustrates a synchronization resource structure according to an embodiment of the present disclosure.

Referring to FIG. 13, the locations of the synchronization resources 1302, 1304, 1306, and 1308 that are used by each synchronization transmission UE to transmit a synchronization signal within one synchronization cycle 1300 may be determined according to the associated relay hop count. In the illustrated example, the synchronization resources 1302, 1304, 1306, and 1308 may be located right just before the resource locations of their associated D2D control/data signals, and may occupy the middle band (e.g., 6 Physical Resource Blocks (PRBs)) of the full D2D bandwidth (BW). A 1-hop synchronization transmission UE may transmit a synchronization signal through the first synchronization resource 1302. A 2-hop synchronization transmission UE may transmit a synchronization signal through the second synchronization resource 1304. A 3-hop synchronization transmission UE may transmit a synchronization signal through the third synchronization resource 1306. A 4-hop synchronization transmission UE may transmit a synchronization signal through the fourth synchronization resource 1308. A next-hop UE or synchronization reception UE may identify the hop count of the synchronization signal according to the location of the resource where the synchronization signal is detected.

In the illustrated synchronization resource structure, the locations of the synchronization resources that can transmit a synchronization signal may be determined according to the relay hop count. In this structure, since a UE of an N-th relay hop depends on a UE of an (N−1)-th relay hop, the timing and frequency error by the reception of the synchronization signal is likely to increase as the hop count is larger.

In the synchronization resource structure illustrated in FIG. 13, when one UE receives synchronization signals of multiple different synchronization transmission UEs, the role of a synchronization transmission UE may be determined by the following procedure.

1) A UE may perform scanning for the synchronization resources 1302, 1304, 1306 and 1308 during the synchronization cycle 1300, and select a synchronization signal having the smallest hop count among one or more synchronization signals detected through the scanning. If there are multiple synchronization signals having the smallest hop count, the synchronization signal that is received at the earliest time within the synchronization cycle 1300 may be selected from the multiple synchronization signals. Alternatively, if there are multiple synchronization signals having the smallest hop count, the synchronization signal having the highest reception power may be selected from the multiple synchronization signals. The earliest reception time condition and the highest reception power condition may make one or more combinations.

2) If the UE is not a synchronization transmission UE, the UE may start relaying a synchronization signal through a synchronization resource having the associated hop count by operating as a synchronization relaying UE with the hop count, which is determined by adding 1 to the hop count of the selected synchronization signal. If the hop count of the selected synchronization signal is the maximum hop count, further synchronization relay may be limited.

3) If the UE is a synchronization transmission UE, the UE may compare the hop count of the UE with the hop count of the synchronization signal selected through the scanning. If the hop count of the selected synchronization signal is greater than or equal to the hop count of the selected synchronization signal, the UE may belong to the same cell (or cluster) as that of the synchronization transmission UEs that have sent the selected synchronization signal, and may operate as a synchronization relaying UE with the hop count, which is determined by adding 1 to the hop count of the selected synchronization signal. If the hop count of the selected synchronization signal is the maximum hop count, further synchronization relay may be limited.

Figure 14:
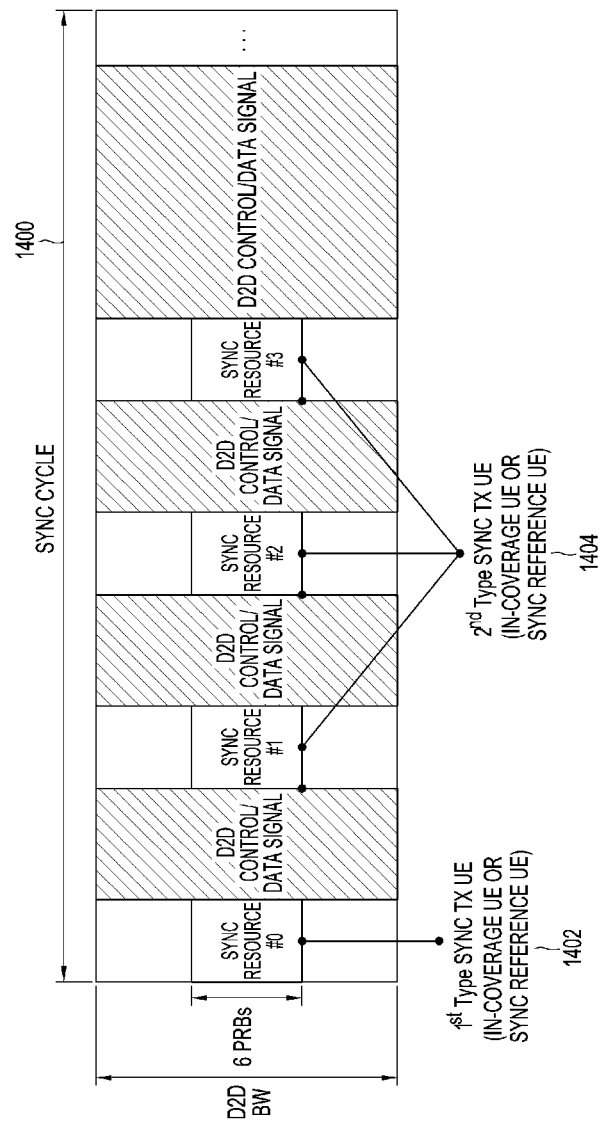
FIG. 14 illustrates a synchronization resource structure according to an embodiment of the present disclosure.

FIG. 14 illustrates a synchronization resource structure according to an embodiment of the present disclosure.

Referring to FIG. 14, at least one synchronization resource 1402 in the location that is determined depending on the relay hop count, and a resource pool 1404 that is at least one shared synchronization resource that can be used regardless of the hop count may be included in one synchronization cycle 1400. The illustrated structure may support a D2D operation in the partial network coverage area.

As for the in-coverage UEs (or UEs located in an eNB coverage area), the risk of collision of synchronization signals between the multiple UEs may be less, since their synchronization transmission is controlled by the in-coverage UEs. Therefore, the eNB may allocate synchronization transmission UEs to a certain number of synchronization resources 1402 that the eNB can allocate. However, an out-of-coverage UE (or a UE located out of the eNB coverage area) that cannot directly communicate with the eNB, should spontaneously determine whether the UE is a synchronization transmission UE according to at least one of above-described various embodiments of the present disclosure. This UE may operate as a synchronization relaying UE or a synchronization support UE, and may measure not only the synchronization signal of a synchronization transmission UE belonging to another cell (or cluster) or an independent synchronization transmission UE, but also the synchronization signal of a synchronization transmission UE belonging to the same cell (or cluster). The out-of-coverage UE may measure a synchronization signal of a synchronization transmission UE belonging to the same cell in the shared synchronization resource 1404 that is determined for a synchronization transmission UE, and based thereon, may determine whether to transmit a synchronization signal.

In the synchronization resource structure illustrated in FIG. 14, when a UE receives synchronization signals of multiple different synchronization transmission UEs, the UE may determine the role of a synchronization transmission UE by the following procedure.

1) A UE may perform scanning for the synchronization resources 1402 and 1404 during the synchronization cycle 1400, and select a synchronization signal having the highest cell ID (or cluster ID) among synchronization signals, the hop count of which is less than the maximum hop count, among one or more synchronization signals detected through the scanning. If there are multiple synchronization signals having the highest cell ID, the synchronization signal having the smallest hop count may be selected from the multiple synchronization signals within the synchronization cycle 1400. Alternatively, if there are multiple synchronization signals having the highest cell ID, the synchronization signal that is received at the earliest time within the synchronization cycle 1400 may be selected from the multiple synchronization signals. Alternatively, if there are multiple synchronization signals having the highest cell ID, the synchronization signal having the highest reception power may be selected from the multiple synchronization signals. The smallest hop count condition, the earliest reception time condition and the highest reception power condition may make one or more combinations.

2) If the UE is not a synchronization transmission UE, the UE may start relaying a synchronization signal through a synchronization resource having the associated hop count by operating as a synchronization relaying UE with the hop count, which is determined by adding 1 to the hop count of the selected synchronization signal. If the hop count of the selected synchronization signal is the maximum hop count, further synchronization relay may be limited.

3) If the UE is a synchronization transmission UE, the UE may compare the current cell ID (or cluster ID) of the UE with a cell ID (or cluster ID) of the synchronization signal selected during the scanning. If the cell ID of the selected synchronization signal is greater than the cell ID of the selected synchronization signal, the UE may belong to the same cell (or cluster) as that of the synchronization transmission UE that has sent the selected synchronization signal, and may operate as a synchronization relaying UE with the hop count, which is determined by adding 1 to the hop count of the selected synchronization signal. If the hop count of the selected synchronization signal is the maximum hop count, further synchronization relay may be limited. If there is no synchronization signal selected during the scanning, or if all the received synchronization signals have the maximum hop count, the UE may operate as an independent synchronization reference UE.

4) If the UE discovers multiple synchronization reference UEs, synchronization of which is not matched between them, during the scanning, the UE may operate as a synchronization support UE. The synchronization support UE may move to another cell (or cluster) depending on the given condition, instead of belonging to any one cell (or cluster), or may operate as a separate independent synchronization transmission UE. The synchronization support UE may be a UE that uses a separate synchronization signal, or may be a UE that operates with the second hop that directly relays the synchronization reference UE, among the synchronization relaying UEs.

It should be noted that the structure of the D2D UE, the D2D synchronization support method, the resource frame structure, and the structure of the UE, which are illustrated in the drawings, are not intended to limit the scope of the present disclosure. In other words, all of the components, entities or operations described in the drawings should not be construed to be essential components for implementation of the present disclosure, and the present disclosure may be implemented only with some of the components without losing the gist of the present disclosure.

The above-described operations of the eNB or the UE may be implemented by mounting a memory device storing a program code in an arbitrary component in the eNB or the UE. In other words, a controller of the eNB or the UE may implement the above-described operations by reading and executing the program code stored in the memory device using a processor or a Central Processing Unit (CPU).

The entities, modules and various components of the eNB or the UE, which are described in this specification, may be operated using a hardware circuit (e.g., a Complementary Metal Oxide Semiconductor (CMOS)-based logic circuit), firmware, and software, and/or a hardware circuit, such as a combination of hardware, firmware and/or software included in a machine-readable medium. For example, various electrical structures and methods may be implemented using electrical circuits, such as transistors, logic gates and Application Specific Integrated Circuits (ASICs).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A device-to-device (D2D) communication method in a user equipment (UE), the method comprising:
    receiving, from a network entity, configuration information comprising information of a first threshold;
    acquiring information of a second threshold;
    if the UE is in a network coverage for D2D communication, measuring a reception power of a first synchronization signal received from a base station, the first synchronization signal comprising a reference signal for D2D communication;
    if the reception power of the first synchronization signal received from the base station is less than the first threshold, determining that the UE operates as a new synchronization reference UE to transmit a synchronization signal for D2D communication and D2D resource configuration information indicating a D2D resource region;
    if the UE is out of the network coverage for D2D communication, measuring a reception power of a second synchronization signal received from another synchronization reference UE; and
    if the reception power of the second synchronization signal received from the other synchronization reference UE is less than the second threshold, determining that the UE operates as the new synchronization reference UE to transmit the synchronization signal for D2D communication and D2D resource configuration information indicating a D2D resource region.

2. The method of claim 1, wherein the second threshold is set to be greater than the first threshold.

3. The method of claim 1, wherein the reception power of the first synchronization signal received from the base station is measured during a measurement period that is one of pre-configured or configured by the base station.

4. The method of claim 1, further comprising:
    if the reception power of the first synchronization signal received from the base station is less than a third threshold, transmitting a request for a synchronization relaying operation to the base station;
    receiving a response to the request for the synchronization relaying operation; and
    determining whether to operate as a synchronization relaying UE.

5. The method of claim 1, further comprising:
    comparing the reception power of the first synchronization signal received from the base station with the first threshold;
    if the reception power of the first synchronization signal received from the base station is greater than or equal to the first threshold and less than a third threshold, relaying the first synchronization signal received from the base station by operating as a synchronization relaying UE; and
    if the reception power of the first synchronization signal received from the base station is less than a fourth threshold that is less than the first threshold, stopping the relaying of the first synchronization signal.

6. The method of claim 5, further comprising, after the stopping of the relaying of the first synchronization signal, receiving a third synchronization signal from a second synchronization reference UE that is located in the vicinity of the UE.

7. The method of claim 5, further comprising, after the stopping of the relaying of the first synchronization signal, generating a synchronization signal and transmitting the generated synchronization signal.

8. The method of claim 1, further comprising, if the reception power of the second synchronization signal received from the synchronization reference UE is less than the second threshold, generating a synchronization signal and transmitting the generated synchronization signal, or relaying the second synchronization signal received from the synchronization reference UE.

9. The method of claim 5, further comprising:
    when starting the relaying of the first synchronization signal, starting a timer; and
    if the reception power of the first synchronization signal received from the base station is less than the first threshold after the timer expires, stopping the relaying of the first synchronization signal.

10. An apparatus for performing device-to-device (D2D) communication in a user equipment (UE), the apparatus comprising:
    a receiver configured to receive configuration information comprising information of a first threshold;
    at least one processor configured to:
    acquire information of a second threshold,
    if the UE is in a network coverage for D2D communication, measure a reception power of a first synchronization signal received from a base station, the first synchronization signal comprising a reference signal for D2D communication, if the reception power of the first synchronization signal received from the base station is less than the first threshold, determine that the UE operates as a new synchronization reference UE to generate a synchronization signal for D2D communication and D2D resource configuration information, if the UE is out of the network coverage for D2D communication, measure a reception power of a second synchronization signal received from another synchronization reference UE, and if the reception power of the second synchronization signal received from the other synchronization reference UE is less than the second threshold, determine that the UE operates as the new synchronization reference UE to generate the synchronization signal for D2D communication and D2D resource configuration information; and a transmitter configured to transmit the generated synchronization signal and the D2D resource configuration information.

11. The apparatus of claim 10, wherein the second threshold is set to be greater than the first threshold.

12. The apparatus of claim 10, wherein the reception power of the first synchronization signal received from the base station is measured during a measurement period that is one of pre-configured or configured by the base station.

13. The apparatus of claim 10, wherein the at least one processor is further configured to:

if the reception power of the first synchronization signal received from the base station is less than a third threshold, transmit a request for a synchronization relaying operation to the base station through the transmitter, and upon receiving a response to the request for the synchronization relaying operation, determine whether to operate as a synchronization relaying UE.

14. The apparatus of claim 10, wherein the at least one processor is further configured to:

compare the reception power of the first synchronization signal received from the base station with the first threshold, if the reception power of the first synchronization signal received from the base station is greater than or equal to the first threshold and less than a third threshold, control the transmitter to relay the first synchronization signal received from the base station by operating as a synchronization relaying UE, and if a reception power of the first synchronization signal received from the base station is less than a fourth threshold that is less than the first threshold, control the transmitter to stop the relaying of the first synchronization signal.

15. The apparatus of claim 14, wherein, after the stopping of the relaying of the first synchronization signal, the at least one processor is further configured to determine to receive a third synchronization signal from a second synchronization reference UE that is located in the vicinity of the UE.

16. The apparatus of claim 14, wherein, after the stopping of the relaying of the first synchronization signal, the at least one processor is further configured to generate a synchronization signal and transmit the generated synchronization signal.

17. The apparatus of claim 10, wherein the at least one processor is further configured to, if the reception power of the second synchronization signal received from the synchronization reference UE is less than the second threshold, determine to generate a synchronization signal and transmit the generated synchronization signal, or determine to relay the second synchronization signal received from the synchronization reference UE.

18. The apparatus of claim 14, wherein the at least one processor is further configured to:

when starting the relaying of the first synchronization signal, start a timer, and if the reception power of the first synchronization signal received from the base station is less than the first threshold after the timer expires, stop the relaying of the first synchronization signal.

* * * * *